Oct. 26, 1948.  R. D. COLLINS  2,452,433
METHOD AND APPARATUS FOR MAKING ELASTIC COIL
CABLES WITH A LONGITUDINAL END
Filed April 12, 1945
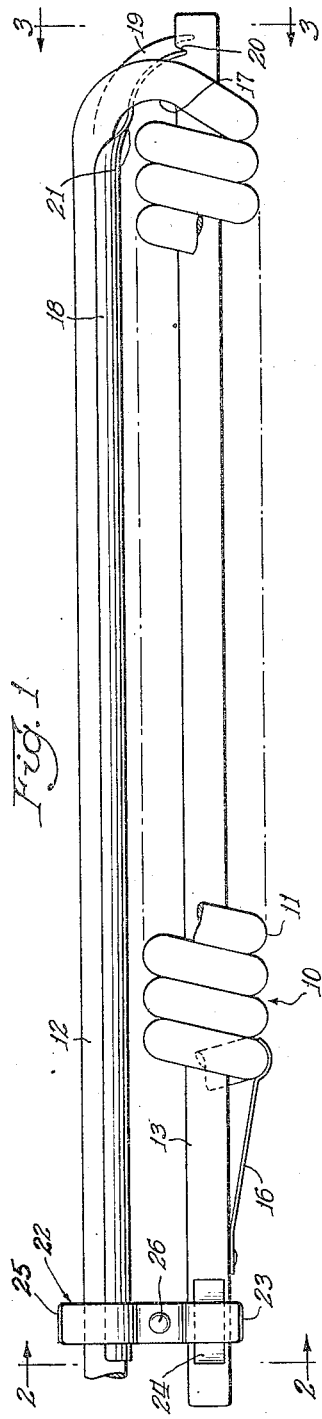
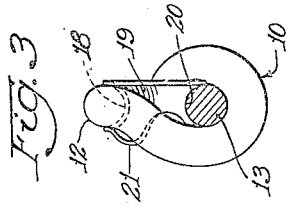
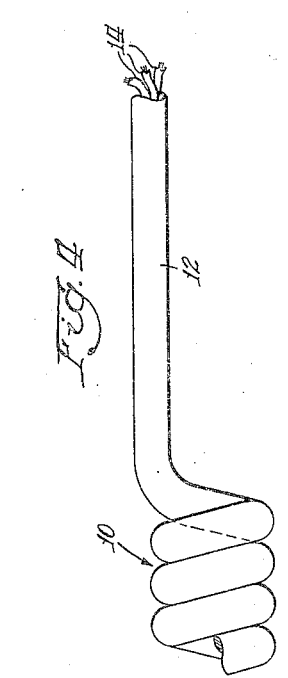
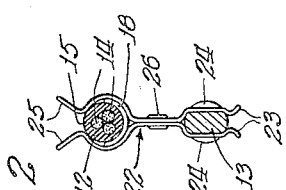
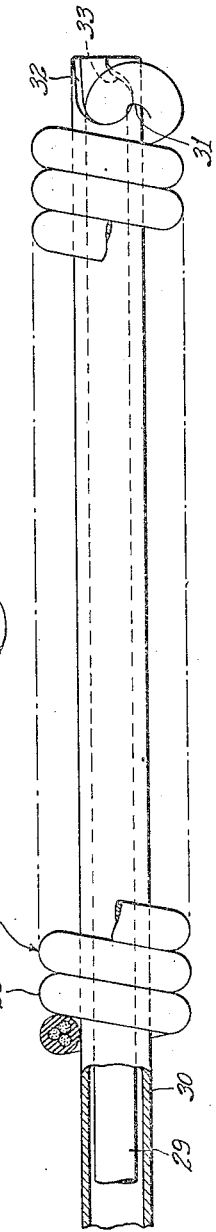
Inventor:
Ralph D. Collins
By: A. Trevor Jones
Atty.

Patented Oct. 26, 1948

2,452,433

UNITED STATES PATENT OFFICE 2,452,433

METHOD AND APPARATUS FOR MAKING ELASTIC COIL CABLES WITH LONGITUDINAL ENDS

Ralph D. Collins, Beverly Hills, Calif., assignor of one-half to Kellogg Switchboard and Supply Company, a corporation of Illinois Application April 12, 1945, Serial No. 588,043

2 Claims. (Cl. 18—6)

This invention relates to elastic coil structures with longitudinal ends.

It is now well known that retractile and extensible extension cords or cables, for various purposes, principally electrical, may be satisfactorily constructed by providing a conductor or a plurality of conductors with a covering or sheath of incompletely vulcanized rubber or the like, then closely coiling it into the form of a helix, and then vulcanizing it, after which the cable will be readily extensible, as, for example, for extension cord purposes, without damage thereto while being automatically retracted by its own resilience to closely coiled helical formation when released, and that the resilience of the cable may be enhanced by reversing the direction of the coils as broadly disclosed and claimed in the Campbell Patent No. 2,173,096.

The present invention aims to provide an improved method and means for making cables of this class, economically and expeditiously in quantity production, with longitudinal ends to provide say connecting tails therefor.

The invention will be readily understood by reference to the following description, taken together with the accompanying drawings, showing an illustrative embodiment of the invention, and in which drawings—

Figure 1 is a view of one means employed in accordance with the present disclosure;

Figure 2 is a section taken on the line 2—2 of Figure 1;

Figure 3 is another section taken on the line 3—3 of Figure 1 and looking in the opposite direction as indicated by the arrows;

Figure 4 is a view, somewhat reduced, of a cable formed in accordance with the present disclosure after reversal of the direction of the coils; and Figure 5 is a view of another means employed in accordance with the present disclosure.

Referring in general to the drawings, it will be understood that the cable includes a coiled portion and an uncoiled portion which is adapted to serve as a connecting tail for the cable.

In accordance with the present invention and turning first to Figure 1, a coiled cable portion is here given the numeral 11 and an uncoiled portion the numeral 12. The mandrel 13 is provided upon which is wound, before vulcanizing, the coiled portion 11 of the cable 10, which as best seen in Figure 2 may comprise one or more conductors 14 which may be twisted together and encased in a covering sheath 15 of vulcanizable material such as rubber or a rubber substitute of which there are many now on the market among the synthetic elastomers, the product known as "Buna S" having been used and found to be suitable.

One end of the coiled cable portion 11 may be held to the mandrel 13 from uncoiling as by a clip 16 and the coiled portion is then wound to the right on the mandrel to such an extent as may be predetermined, whereupon the cable may be bent back upon itself as by the uncoiled portion 12 a bight 17 of the cable occurring between the coiled and uncoiled portion where the cable is bent thereat. In this instance, the uncoiled portion 12 of the cable is held parallel with the mandrel 13 and extends longitudinally of the coiled portion 11 and lapping the latter but spaced therefrom by holding means represented in this instance by a metal semi-cylindrical or trough-like piece 18 in which the cable portion 12 lies and which spaces the uncoiled portion 12 from the mandrel and from the coiled cable portion 11 as next described.

At one end, that is adjacent the bight 17 of the cable, the trough piece 18 is arcuately bent as at 19 to extend away from the mandrel and the extreme end of the arcuately bent part 19 is curvedly notched as at 20 to receive the mandrel therein and the trough piece is thus held to the mandrel at this end by the cable itself which extends thereover. At the place where the cable enters the trough piece, for example as at 21, the trough piece is curvilinear, which is to say that it is cut away on rounded lines, avoiding sharp edges or corners which might mark the initially soft flexible material of the cable covering sheath 15.

At its other end, the trough piece 18 is spaced from the mandrel and the coiled portion of the cable, and, at the same time, both the trough piece and the uncoiled cable portion 12 may be held in the position shown by expedients such as the clip 22 which has two spring jaw portions, a pair at each end. One of these pairs of jaws is represented by the numeral 23 and comprising a pair of spring jaws which are adapted to slip onto the mandrel against their own resilience and yieldingly grip the mandrel, the latter being cut away as desired as at 24 to provide flat surfaces which the spring jaws 23 may grip and prevent rotation of the clip 22 on the mandrel. At its other or outer end, the spring clip 22 may comprise another spring jaw portion 25 in which the trough piece 18 with the uncoiled portion 12 of the cable may be received, the jaws being of sinuous formation to permit entry into or removal therefrom of the trough piece and cable while gripping the latter parts when therein. The two similar parts of the clip which provide the pairs of jaws may be riveted together as at 26.

The structure shown in Figure 1, including the mandrel 13 and the cable 10 thereon as shown, is subjected to a vulcanizing treatment, of any suitable character, to cure and set the rubber-like material of the cable, and, when this has been done, the cable 10 is then removed from the mandrel. Thereupon the coils of the cable are desirably reversed in direction of pitch, so that the coil turns form a right-hand screw-thread, so to speak, instead of a left-hand screw-thread as in Figure 1. This reversal of the coil, as shown in Figure 4, will advantageously cause the longitudinally extending or uncoiled portion of the cable such as 12 to extend in the opposite axial direction from that which it extends in Figure 1, and namely, away from the coiled portion and not lapping it as in Figure 1. Thus in the completed cable or extension cord of Figure 4, the cable part 12 provides a suitable connecting tail for the cable, the wires 14 of this connecting tail being suitably bared and soldered as may be desired.

In the modification shown in Figure 5, the cable 27 has the coiled portion 28 and uncoiled or longitudinally extending portion 29. In this instance, the mandrel 30 is hollow and after the coiled portion 28 of the cable 27 has been wound upon the mandrel as shown in Figure 5, the uncoiled portion 29 is inserted or tucked into the interior bore of the mandrel, and thus extending not only longitudinally of and lapping the coiled portion 28 of the cable but also within the coiled portion.

Here again, where the uncoiled portion 29 of the cable 27 enters the mandrel and in the vicinity of the bight 31 of the cable between the coiled and uncoiled portions, the mandrel is desirably slotted as at 32, the edges of the slot being arcuate as at 33 and thus providing a curvilinear formation which avoids sharp edges or corners which might mark the soft material of the cable sheath 15.

The same thing may occur at the other or left-hand end (not shown) of the structure shown in Figure 5.

Thereupon, the structure shown in Figure 5 is vulcanized as already referred to with reference to Figure 1, and, after vulcanization, the cable of Figure 5 is removed from the mandrel and may have its coils reversed as shown in Figure 4, whereupon the uncoiled or longitudinally extending portion 29 of the cable 27 will extend outwardly away from the coiled portion to form a connecting tail as does the portion 12 of the cable 10 seen in Figure 4.

A function accomplished by the structure and method of Figure 5, beyond that already described, is that the connecting tail 29 of the cable 27 may be produced with a less degree of vulcanization or cure than that of the coiled portion 28, since the portion 29 is protected by the mandrel 30 from the maximum heat of the furnace or the like in which the cable is vulcanized; and consequently the rubber-like sheath 15 of the cable connecting tail 29 is kept relatively softer than that of the coiled portion 28. When the connecting tail 29 is soldered to an electrical device, the material 15 thereof may be somewhat molded to and further vulcanized with a similar rubber-like covering which may be on such electrical device.

The invention is not limited to details of construction or operation here shown for purposes of exemplification and such changes may be made as fall within the scope of the appended claims without departing therefrom.

The invention having been described, what is here claimed is:

1. The method of making elastic coil cables with uncoiled ends, embodying a vulcanizable material, which is characterized by the steps of forming a portion of the cable into a coil, providing another integral materially extending portion of the cable uncoiled, bending the uncoiled portion at its juncture with the coiled portion, holding said uncoiled portion spaced from the coiled portion and extending in a direction lappingly of the coiled portion, supporting the uncoiled portion at a place therealong spaced from the place where the uncoiled portion is bent, vulcanizing the material while maintaining said coiled and uncoiled portions in said forms, removing the cable from the support, and reversing the direction of the coils, whereby said uncoiled portion provides an uncoiled end for the cable of predetermined formation and extending axially away from the coiled portion.

2. Means for making elastic coil cables with uncoiled ends embodying a vulcanizable material, comprising a mandrel for coiling a portion of the cable thereon in the form of a helix when the vulcanizable material thereof is incompletely vulcanized, and support means carried by the mandrel for supporting an uncoiled portion of the cable spaced from and in a direction lappingly of the coiled portion, said means preventing the uncoiling of said coiled portion and the coiling of said uncoiled portion during subsequent vulcanization of the material on the mandrel, whereby to form a coiled structure having an uncoiled end of predetermined formation, wherein the last mentioned means includes a curvilinear guide formation accommodating the bight of the cable between the coiled and uncoiled portions to avoid marking the cable at said bight.

RALPH D. COLLINS.

REFERENCES CITED

The following references are of record in the file of this patent:

UNITED STATES PATENTS

| Number | Name | Date |
| --- | --- | --- |
| 458,115 | Thomson | Aug. 18, 1891 |
| 2,039,475 | Campbell | May 5, 1936 |
| 2,173,096 | Campbell | Sept. 19, 1939 |
| 2,271,057 | Barrans | Jan. 27, 1942 |
| 2,339,683 | Cox | Jan. 18, 1944 |
| 2,394,762 | Geraty | Feb. 12, 1946 |
| 2,424,426 | Arnold | July 22, 1947 |